United States Patent
Kodera

(10) Patent No.: US 10,929,723 B2
(45) Date of Patent: Feb. 23, 2021

(54) INFORMATION PRESENTING APPARATUS, INFORMATION PRESENTING METHOD AND PROGRAM

(71) Applicant: FUJIFILM Corporation, Tokyo (JP)

(72) Inventor: Kanako Kodera, Yokohama (JP)

(73) Assignee: FUJIFILM Corporation, Tokyo (JP)

( * ) Notice: Subject to any disclaimer, the term of this patent is extended or adjusted under 35 U.S.C. 154(b) by 49 days.

(21) Appl. No.: 16/200,822

(22) Filed: Nov. 27, 2018

(65) Prior Publication Data

US 2019/0197348 A1 Jun. 27, 2019

(30) Foreign Application Priority Data

Dec. 27, 2017 (JP) .............................. JP2017-251805

(51) Int. Cl.
*G06K 9/62* (2006.01)
*G06K 9/00* (2006.01)

(52) U.S. Cl.
CPC ......... *G06K 9/628* (2013.01); *G06K 9/00684* (2013.01); *G06K 9/6215* (2013.01); *G06K 9/6262* (2013.01)

(58) Field of Classification Search
CPC .. G06K 9/628; G06K 9/00684; G06K 9/6215; G06K 9/6262
See application file for complete search history.

(56) References Cited

U.S. PATENT DOCUMENTS 6,389,181 B2 * 5/2002 Shaffer ............... H04N 1/00132
358/403
2009/0248692 A1 10/2009 Tsukagoshi et al.
(Continued)

FOREIGN PATENT DOCUMENTS

JP 2009-259238 A 11/2009
JP 2015-069431 A 4/2015
(Continued)

OTHER PUBLICATIONS

An Office Action dated by the Japanese Patent Office on Nov. 27, 2020, which corresponds to Japanese Patent Application No. 2017-251805 and is related to U.S. Appl. No. 16/200,822.

*Primary Examiner* — Wesley J Tucker

(74) *Attorney, Agent, or Firm* — Studebaker & Brackett PC

(57) ABSTRACT

An object of the present invention is to provide an information presenting apparatus, method, and a program capable of promoting a user to variously use images according to a category to which an image owned by a user belongs.

The category classifying unit classifies images uploaded from the first user terminal and the second user terminal to the SNS server by machine learning into any one of defined categories such as "nature field", "art field", "wedding field", "snap field" and the like. The category determining unit determines the category of the trigger image identified by the trigger image identification information. The recommended information extracting unit extracts images (recommended images) belonging to the same category as the category determined by the category determining unit. The recommended information presenting unit presents the recommended image and/or recommended image related information extracted by the recommended information extracting unit, to the first user terminal as recommended information.

12 Claims, 13 Drawing Sheets

(56) References Cited

U.S. PATENT DOCUMENTS

| | | | | |
|---|---|---|---|---|
| 2012/0239506 A1* | 9/2012 | Saunders | ............... | G06Q 30/02 |
| | | | | 705/14.67 |
| 2015/0092070 A1 | 4/2015 | Hatano et al. | | |
| 2016/0371791 A1 | 12/2016 | Lee | | |
| 2017/0032443 A1 | 2/2017 | Nakashima | | |
| 2017/0053188 A1* | 2/2017 | Tohidi | ................ | H04N 5/23222 |
| 2019/0354609 A1* | 11/2019 | Huang | .................... | G06F 16/56 |

FOREIGN PATENT DOCUMENTS

| | | |
|---|---|---|
| JP | 2016-177827 A | 10/2016 |
| JP | 2017-010546 A | 1/2017 |
| JP | 2017-033300 A | 2/2017 |
| JP | 2017-146745 A | 8/2017 |

\* cited by examiner

INFORMATION PRESENTING APPARATUS, INFORMATION PRESENTING METHOD AND PROGRAM

CROSS-REFERENCE TO RELATED APPLICATIONS

The present application claims priority under 35 U.S.C. § 119 to Japanese Patent Application No. 2017-251805, filed on Dec. 27, 2017. The above application is hereby expressly incorporated by reference, in its entirety, into the present application.

BACKGROUND OF THE INVENTION

1. Field of the Invention

The present invention relates to an information presenting apparatus, an information presenting method, and a program, and in particular, to an information presenting apparatus, an information presenting method, and a program for presenting information promoting the use of an image.

2. Description of the Related Art

JP2017-010546A discloses that in a case where a word "travel photograph" or a sentence "transmit photographs" is entered, it is possible to search for metadata of photographs stored in a device of the other party and provide a photograph list as recommended information such that photographs imaged at the travel destination that the other party has visited together may be attached and transmitted.

JP2009-259238A discloses that subject extraction and face extraction are performed, image classification for each subject is performed, image sharing is performed, and preference matching of the other party of sharing is performed. There is disclosed that preference of images may be registered by tag information or image analysis and layout information of the preference of the other party of sharing may be also registered.

SUMMARY OF THE INVENTION

Out of a number of photographs imaged in the world, photographs that the user wants to print or want to decorate on the wall may be classified into categories such as a nature field, an art field, a wedding field, and a snap field (family photographs, and travel photographs). Photographs that the user does not want to decorate (failed images, and screen captures of smartphones), and the like may be also classified into a category of "other".

In JP2017-010546A and JP2009-259238A, it is impossible to recommend images that do not belong to a specific category. That is, in JP2017-010546A, it is impossible to provide a recommended image for a photograph that is not a travel photograph. In JP2009-259238A, it is impossible to perform a recommendation for images that do not include a subject.

The present invention provides an information presenting apparatus, an information presenting method, and a program capable of promoting a user to variously use images according to a category to which images owned by the user belong.

An information presenting apparatus according to an embodiment of the present invention comprises: a determining unit that determines a category for which a first user is interested, based on an image group owned by the first user; an extracting unit that extracts information on at least one of an image belonging to the same category as the category determined by the determining unit, accessory information of the image, or merchandise attached to the image; and a presenting unit that presents the information extracted by the extracting unit.

According to the embodiment of the present invention, at least one of the image belonging to the same category as the category of the image owned by the first user, the accessory information of the image, or the merchandise attached to the image is extracted, the information is presented.

Thus, it is possible to promote the first user to variously use images according to the category to which the images owned by the first user belongs.

It is preferable that the determining unit determines the category for which the first user is interested, based on the feature amount of the image group owned by the first user.

It is preferable that the determining unit determines the category for which the first user is interested, based on an imaging parameter, imaging date and time, or an imaging position of an image group owned by the first user.

It is preferable that the determining unit determines, from the imaging parameter of the image group owned by the first user, that the category for which the first user is interested is nature, and the extracting unit extracts the imaging position different from an imaging position of the image group owned by the first user, from an image group owned by a second user other than the first user.

It is preferable that the determining unit determines, from the feature amount of a selected image selected from the image group owned by the first user, that the category for which the first user is interested is art, and the extracting unit extracts an image other than the selected image, having a feature amount similar to the feature amount of the selected image, from the image group owned by the first user.

It is preferable that the determining unit determines, from the imaging date and time of the image group owned by the first user, that the category for which the first user is interested is a wedding, and the extracting unit extracts an image having imaging date and time that is the same as or close to the imaging date and time of the image group owned by the first user, from the image group owned by the first user.

It is preferable that the extracting unit extracts a merchandise attached to an image having imaging date and time that is the same as or close to the imaging date and time of the image group owned by the first user.

It is preferable that the determining unit recognizes an object from the image group owned by the first user, and determines, from an object recognized from the image group owned by the first user, that the category for which the first user is interested is snap, and the extracting unit extracts an image having an object similar to an object recognized from the image group owned by the first user.

It is preferable that the presenting unit presents a layout of the extracted image.

It is preferable that the information presenting apparatus further comprises a classifying unit that classifies each image of the image group into any one of one or more categories, based on a feature amount of the image group owned by the first user, in which the determining unit determines the category for which the first user is interested, according to a result obtained by classifying each image of the image group into any one of one or more categories by the classifying unit.

It is preferable that the classifying unit learns the classification of each image by machine learning, based on a learning image group and teacher data indicating a result of classification to any one of the one or more categories of each image of the learning image group.

It is preferable that each image of the learning image group includes at least one of image feature information, metadata, or annotation information.

The information presenting method according to an embodiment of the present invention comprises: by a computer, determining a category for which the first user is interested, based on an image group owned by a first user extracting information on at least one of an image belonging to the same category as the determined category, accessory, information of the image, or merchandise attached to the image; and presenting the extracted information.

The present invention further includes an information presenting program for causing the computer to execute an information presenting method described above.

According to the present invention, at least one of the image belonging to the same category as the category of the image owned by the first user, the accessory information of the image, or the merchandise attached to the image is extracted, the information is presented. Thus, it is possible to promote the first user to variously use images according to the category to which the images owned by the first user belongs.

BRIEF DESCRIPTION OF THE DRAWINGS

FIG. 1 is a diagram showing an example of an image group of an "art field".

DESCRIPTION OF THE PREFERRED EMBODIMENTS

Figure 1:
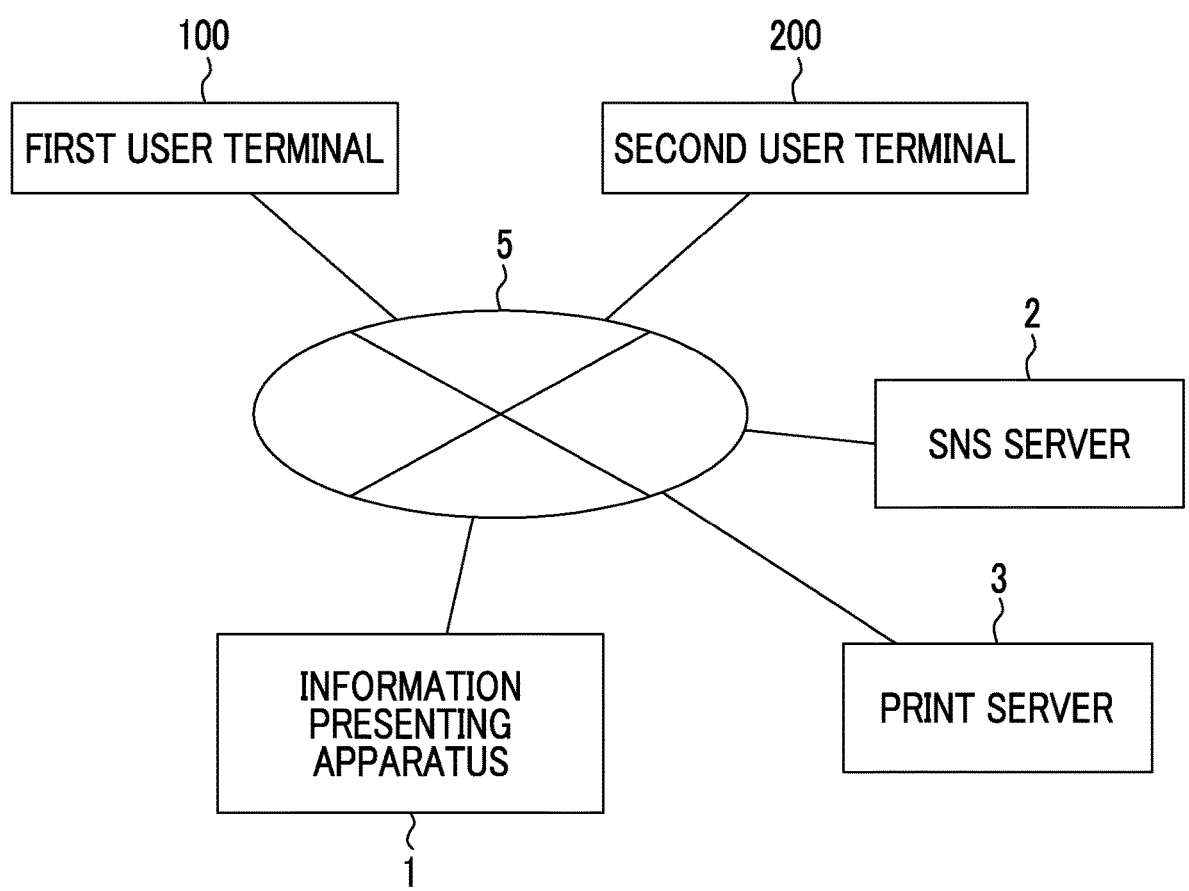
FIG. 1 is a schematic configuration diagram of an information presenting system.

FIG. 1 is a schematic configuration diagram of an information presenting system according to a first preferred embodiment of the present invention. The information presenting system includes an information presenting apparatus 1, a first user terminal 100, a second user terminal 200, a Social Networking Service (SNS) server 2 and a print server 3 in connection with one another through a network 5 such as the Internet. All the information presenting apparatus 1, the first user terminal 100, the second user terminal 200, the SNS server 2 and the print server 3 may be configured with a known computer. The information presenting apparatus 1 may be incorporated into one of the first user terminal 100, the second user terminal 200, the SNS server 2 or the print server 3.

The SNS server 2 is a known server that manages to share information among a plurality of users including users of the first user terminal 100 and the second user terminal 200. The information managed by the SNS server 2 is a relationship of users (friends, members of a community, and the like), a rule of sharing various types of information such as a message, an image, and position information according to the relationship of the users, and the like. Herein, it is considered that both relationships between the users of the first user terminal 100 and the second user terminal 200 belong to a community called "travel" established by individuals or companies having a relationship with a travel industry.

The print server 3 is a known server that may accept a print order instructing to print an optionally designated image in an optionally designated format from a user terminal including the first user terminal 100, and perform settlement of charge, and issuing an order of a photograph print according to the print order, and the like. The print server 3 may be a server for network ordering or a storefront print terminal.

The information presenting apparatus 1, the SNS server 2, and the print server 3 may be configured with one computer, or may be connected to a local area network or a wireless communication network.

The first user terminal 100 and the second user terminal 200 may access the SNS server 2 through the network 5 and share various types of information such as images and texts with one another. A plurality of second user terminals 200 may be provided.

A first user who is a user uses the first user terminal 100 to own an image. A second user who is another user uses the second user terminal 200 to own another image.

Here, that the first user or the second user "owns" an image includes that the first user or the second user stores an image optionally designated by themselves to be controllable in the first user terminal 100, the second user terminal 200, the SNS server 2, the print server 3, other computers (not shown), cloud computing, or a computer-readable storage medium. That the first user or the second user is able to control an image means that the first user or the second user has authority for using the image in terms of software such as reading out, browsing, transmitting, copying, editing, or setting of access authority.

Figure 2:
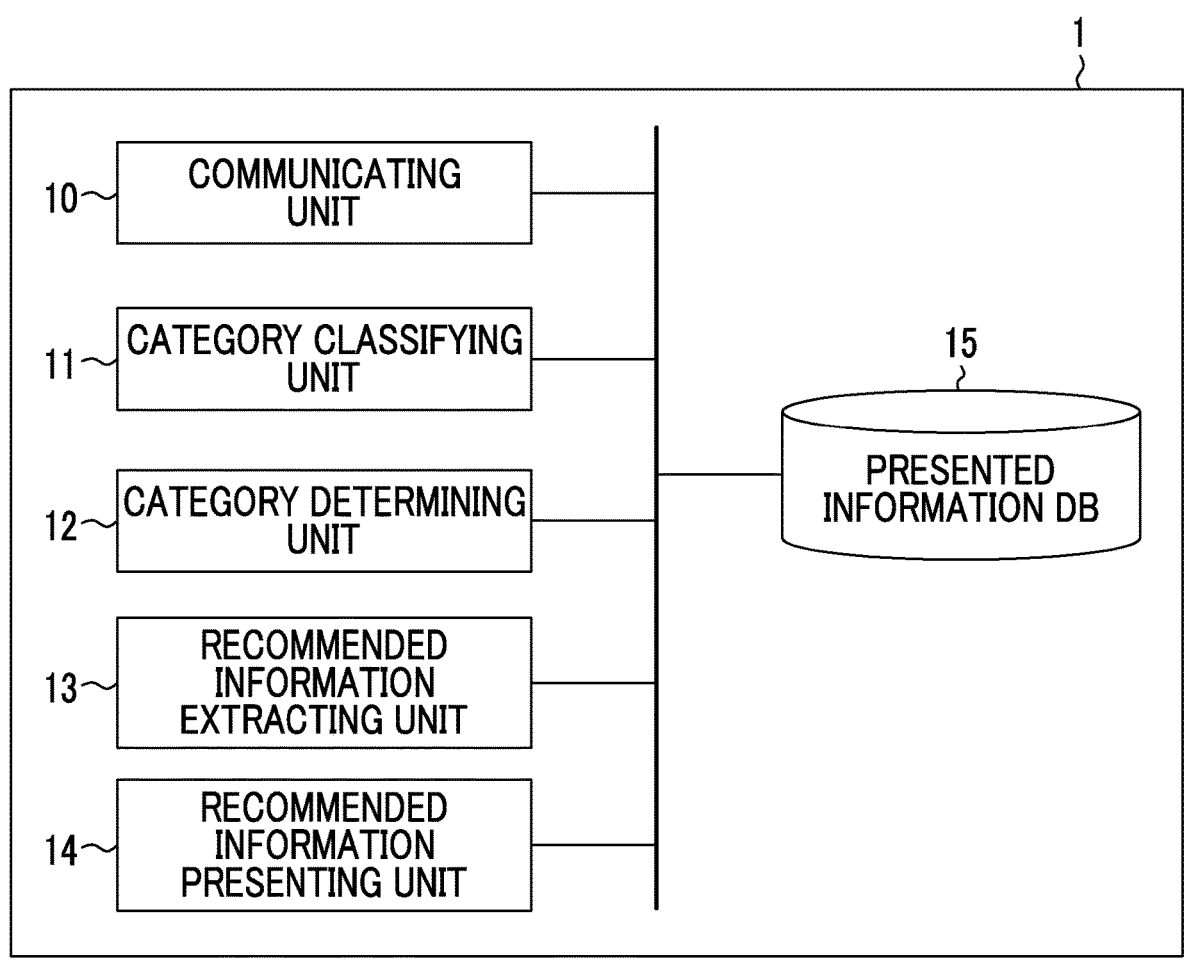
FIG. 2 is a block diagram of an information presenting apparatus.

FIG. 2 is a configuration diagram of the information presenting apparatus 1. The information presenting apparatus 1 includes a communicating unit 10, a category classifying unit 11, a category determining unit 12, a recommended information extracting unit 13, a recommended information presenting unit 14, and a presented information database 15.

The communicating unit 10 is connected to the first user terminal 100, the second user terminal 200, the SNS server 2, and the print server 3 through the network 5, and transmits and receives various types of information.

The category classifying unit 11 classifies images uploaded from the first user terminal 100 and the second user terminal 200 to the SNS server 2, into any one of defined categories such as a "nature field", an "art field", a "wedding field", and a "snap field".

This classification by the category classifying unit 11 is performed by machine learning. For example, an administrator designates a category into which images are desired to be classified, and prepares an image group (teacher data) for machine learning. First, the administrator classifies each prepared image group into a designated category. As a result, each image is classified into one category. Then, image information (histogram, frequency, and the like), metadata (aperture, shutter speed, imaging position information configured with a Global Positioning System (GPS), and the like) and annotation information of images classified into each category are extracted as a category classification element of the images belonging to each category. Then, based on the feature information of the images belonging to each category, classification criteria of images for each category (corresponding relationship between weights and categories for each category classification element) is learned. This means that, for example, a large f-number (aperture) causes a weight for classifying an image into the nature field to be increased, a subject having a number of faces causes another weight for classifying an image into the snap field to be increased, an image in which a type of a detected object is an animal or a plant is classified into the nature field, an image in which a subject wearing a wedding costume is detected is classified into the wedding field, or a group of images having similar imaging date and time, and image feature amount are classified into the art field, so that weighting (a degree of user's interest) of the category classification element is learned.

Out of images uploaded from the first user terminal 100 to the SNS server 2, the category determining unit 12 receives, through the communicating unit 10 from the print server 3, trigger image identification information that is information for identifying an image (trigger image) for which a print order is given from the first user terminal 100 to the print server 3.

The trigger image identification information does not have to be derived from the print order, but may be any information as long as it is information for identifying an image designated by the first user terminal 100 for the purpose of providing some service. For example, information for identifying an image for which uploading has been designated for publication to another person through the SNS server 2, an image for which a storefront print order is given through a recording medium, and an image uploaded to the cloud may be used as the trigger image identification information.

Out of images that have been uploaded from the second user terminal 200 to the SNS server 2 and permitted to be shared with the first user terminal 100, the category determining unit 12 determines a category of an image identified by the trigger image identification information. The image identified by the print image identification information is classified into any category by the category classifying unit 11.

The recommended information extracting unit 13 extracts an image recommended image) belonging to the same category as the category determined by the category determining unit 12, from the first user terminal 100, the second user terminal 200, or the SNS server 2. The recommended information extracting unit 13 extracts information (merchandise, travel information, and the like) related to the recommended image, from the presented information DB 15.

The recommended information presenting unit 14 presents the recommended image and recommended image related information extracted by the recommended information extracting unit 13, to the first user terminal 100. A method of presenting is optional. For example, the recommended information presenting unit 14 transitions a screen from a print order screen transmitted to the first user terminal 100 by the print server 3, to a display screen of the "recommended information", and displays recommended information (recommended image, or a preview image of merchandise, or the like) extracted by the recommended information extracting unit 13 on the display screen. It is user's freedom whether or not to actually order merchandise and services according to this display.

The presented information database (DB) 15 is a database that stores recommended information (picture frame of the recommended image, recommended additional print order, and the like) corresponding to any one of the defined categories. For example, in the presented information DB 15, layout information of the image of a wall-attached album is stored in association with features such as a wall color and area, the number of images, and a feature amount of the image.

The communicating unit 10, the category classifying unit 11, the category determining unit 12, the recommended information extracting unit 13, and the recommended information presenting unit 14 of the information presenting apparatus 1 are configured with various types of processors (information processing apparatuses) such as one or a plurality of CPUs and peripheral circuits (RAM, ROM, and the like) thereof.

Figure 3:
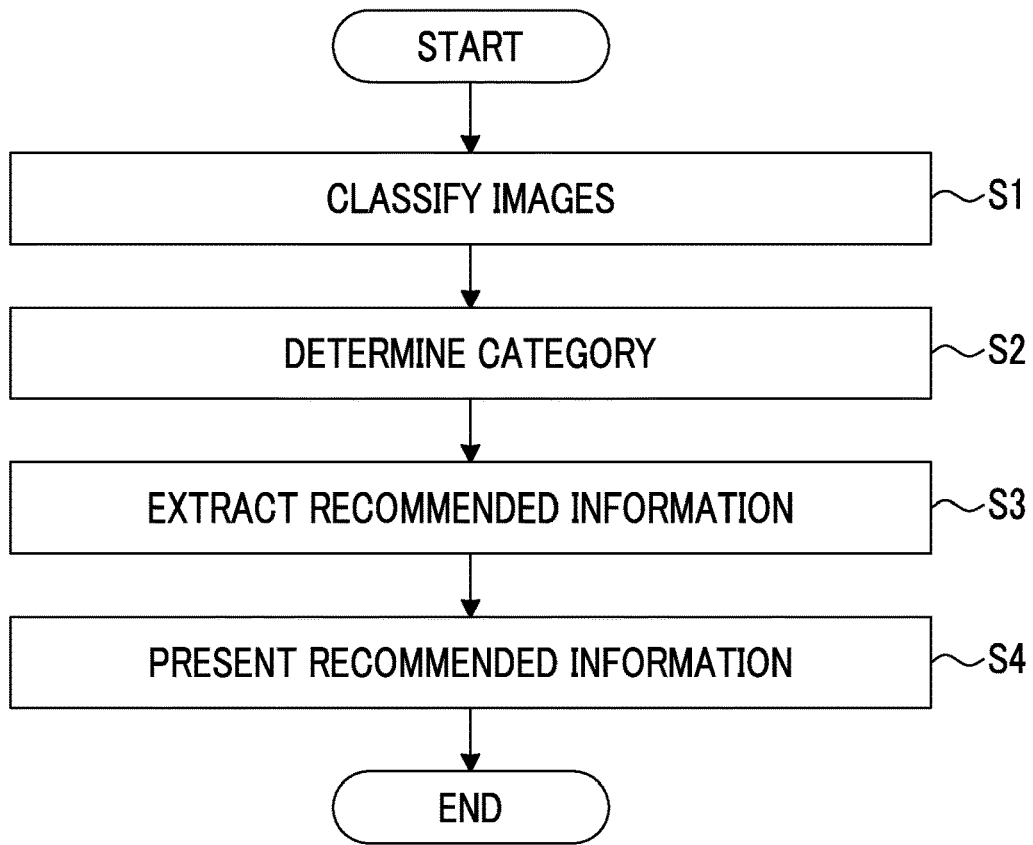
FIG. 3 is a flowchart showing a flow of information presentation processing of the information presenting apparatus.

FIG. 3 is a flowchart showing the flow of information presentation processing of the information presenting apparatus 1. A program for causing the information presenting apparatus 1 to execute this information presentation processing is stored in a non-transitory tangible medium (ROM or the like) that is readable by the information presenting apparatus 1.

In S1, the category classifying unit 11 classifies the images uploaded from the first user terminal 100 and the second user terminal 200 to the SNS server 2, into any one of the defined categories such as a "nature field", an "art field", a "wedding field" and a "snap field", by machine learning. An image belonging to none of the defined categories or an image of which classification is non-determinable may be classified into "other" category.

In S2, the category determining unit 12 receives the trigger image identification information from the print server 3 through the communicating unit 10. The category determining unit 12 determines the category of the trigger image identified by the trigger image identification information.

In S3, the recommended information extracting unit 13 extracts an image (recommended image) belonging to the same category as the category determined by the category determining unit 12, from at least one of the first user terminal 100, the SNS server 2, the presented information DB 15 or the second user terminal 200 according to the category.

In S4, the recommended information presenting unit 14 presents the recommended image and/or recommended image related information extracted by the recommended information extracting unit 13 to the first user terminal 100 as recommended information. The presenting mode is optional, such as display of recommended information on a display, and sound attached to display.

As a result of the determination by the category determining unit 12 in S2, the category becomes any one of a "nature field", an "art field", a "wedding field", or a "snap field". Hereinafter, there will be shown the details of the flow of information presentation processing for each of cases where, as a result of the determination, the category becomes a "nature field", an "art field", a "wedding field", or a "snap field".

Recommended Information Presentation of Nature Field

Figure 4:
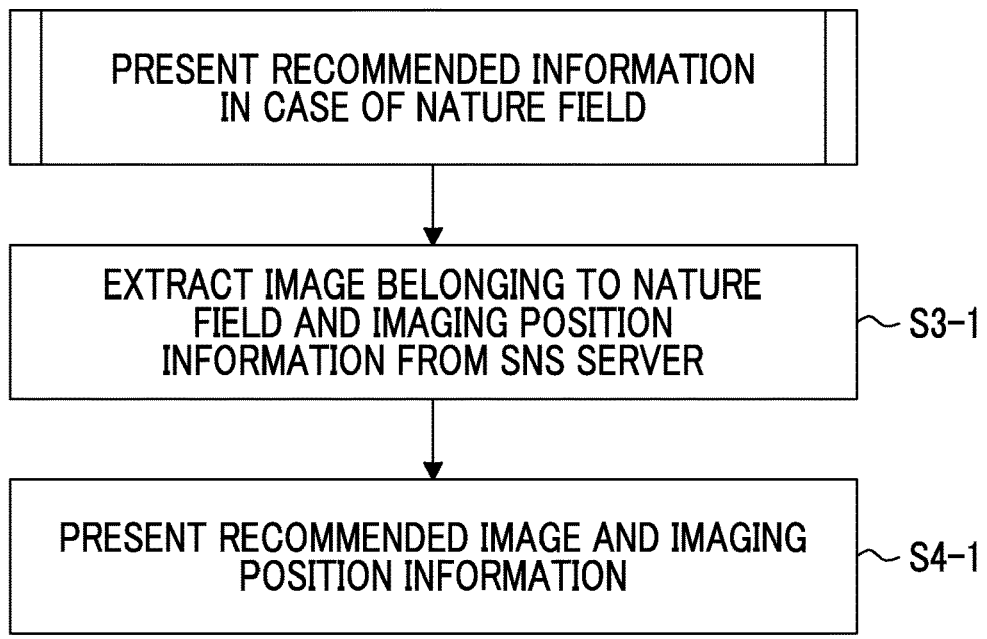
FIG. 4 is a flowchart showing the details of recommended image extraction and recommended image presentation processing of a "nature field".

FIG. 4 is a flowchart showing the details of recommended image extraction and recommended image presentation processing in a case where it is determined that the category of the trigger image is a "nature field". That is, the following processing is processing performed in a case where it is determined in S2 that the category of the trigger image is a "nature field".

In S3-1, the recommended information extracting unit 13 extracts an image (recommended image) belonging to a "nature field" which is the same category as the category determined by the category determining unit 12 and imaging position information of the image, from the SNS server 2.

In S4-1, the recommended information presenting unit 14 presents the recommended image extracted by the recommended information extracting unit 13 and the imaging position information of the recommended image, to the first user terminal 100 as recommended information.

Figure 5:
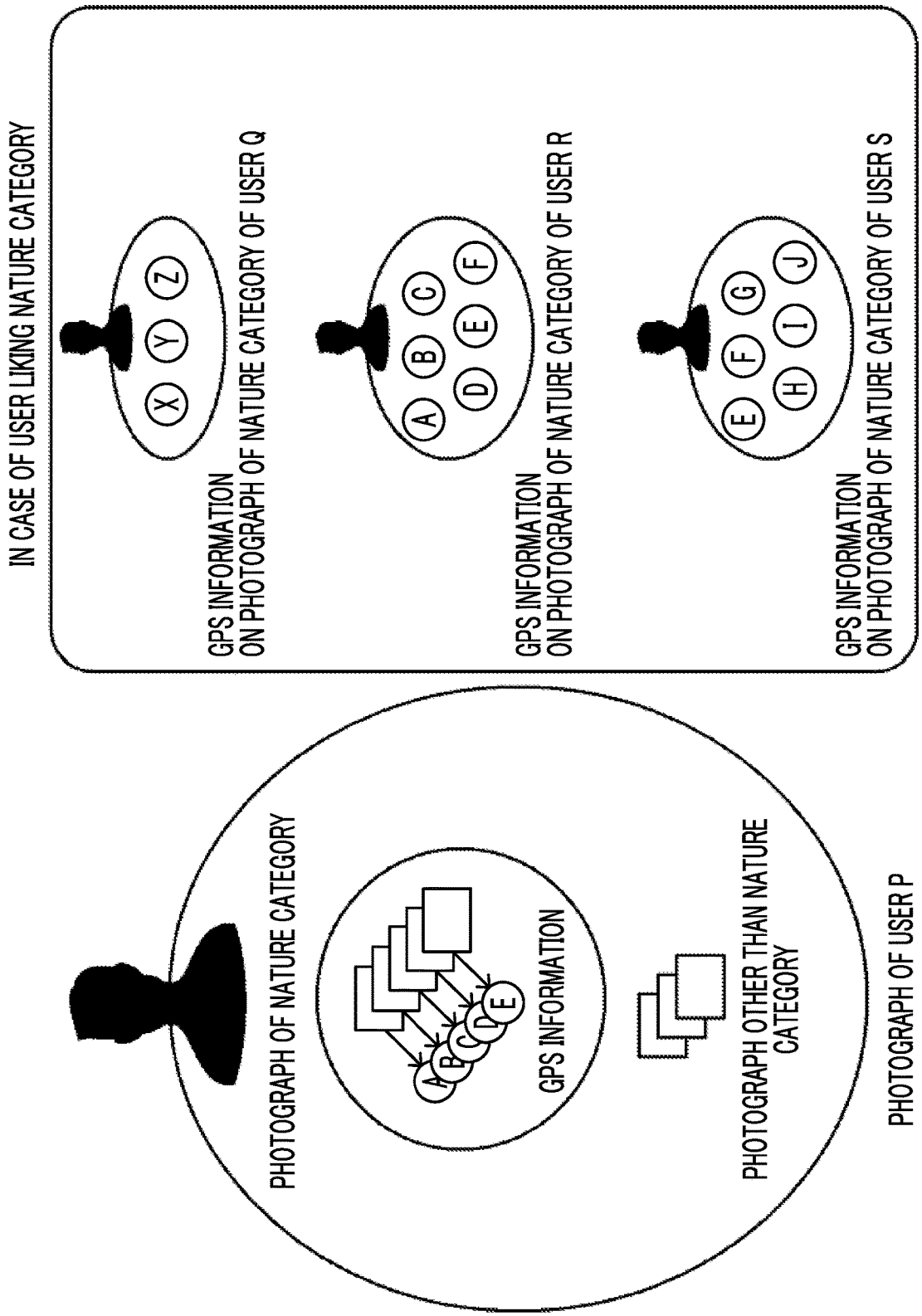
FIG. 5 is a diagram conceptually showing an image group of a "nature field" owned by a user.
Figure 6:
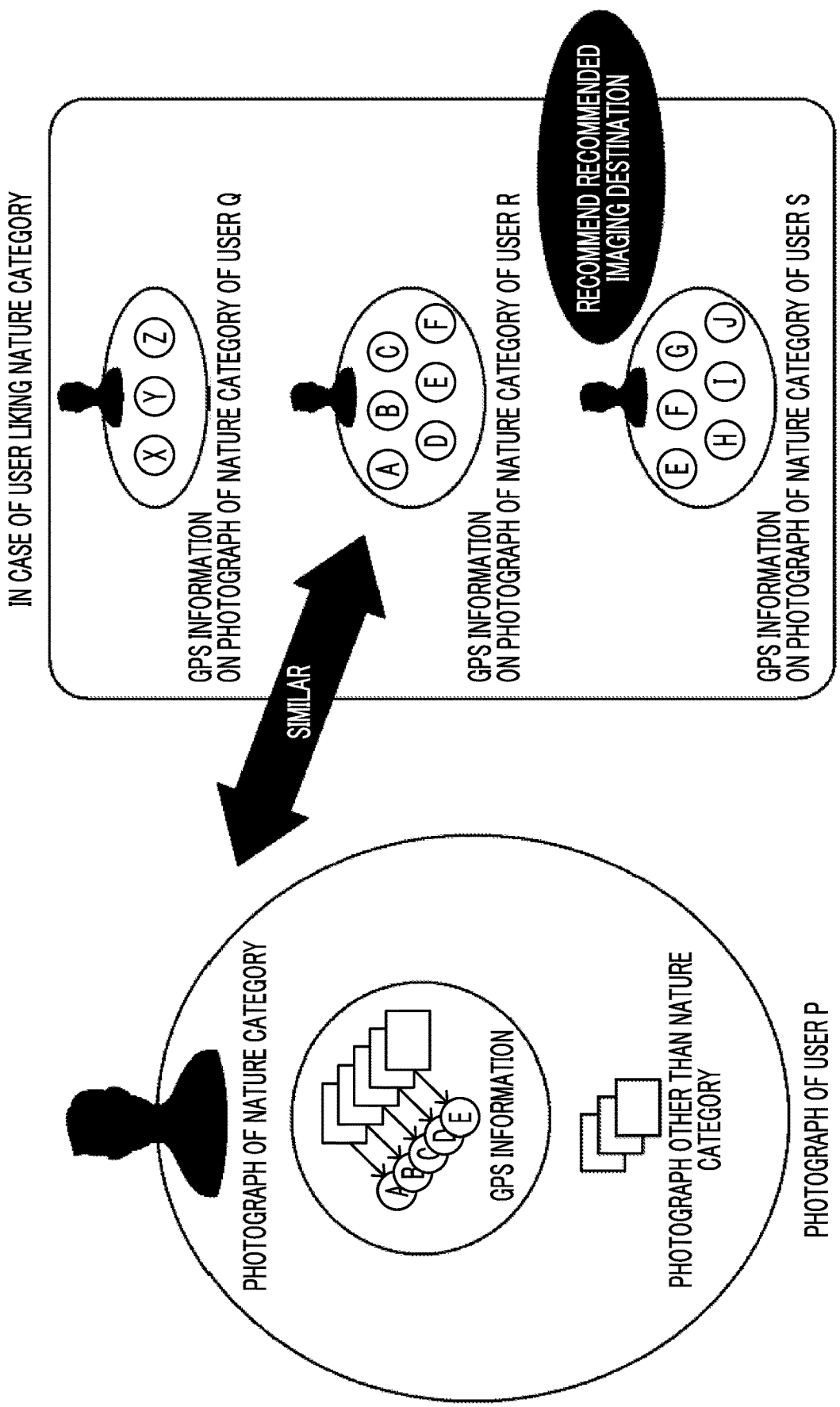
FIG. 6 is a diagram conceptually showing a method of presenting recommended information on a "nature field".

FIG. 5 and FIG. 6 conceptually show a method of presenting the recommended information of a "nature field" by the recommended information presenting unit 14.

As shown in FIG. 5, an image, which has been uploaded to the SNS server 2 by the user P who is a user of the first user terminal 100, is classified, into a "nature field", or category other than the nature field by the category classifying unit 11. Similarly, an image, which has been uploaded to the SNS server 2 by a user Q, a user R, a user S, and, . . . , Who are users of a plurality of second user terminals 200, is classified into a "nature field", or other category than the nature field by the category classifying unit 11.

In a case where a print order image designated by the user P of the first user terminal 100 belongs to the "nature field", similarly, the category determining unit 12 retrieves an uploaded image of the user Q, the user R, the user S. and, . . . , belonging to the "nature field" from the SNS server 2.

The recommended information presenting unit 14 transmits and presents the retrieved image to the first user terminal 100 as recommended information. The recommended information presenting unit 14 may present an image which has been imaged at a similar place, and in order to present useful information that the users do not recognize by themselves, the recommended information presenting unit 14 may also present an image which has been imaged at a different place from the image of the same nature field, or imaging position information of the image as recommended information. That is, the recommended information presenting unit 14 specifies a user with the largest number of images belonging to a category "nature field" of the image identified by the print image identification information, the images having the imaging position information which is close to the imaging position information of the image identified by the print image identification information.

For example, as shown in FIG. 6, the user R owns more "images A, B, C, D, and E" of the "nature field" which is the same case as (or is, to some degree, close to) the imaging position information of the user P, than the user Q and the user S. Therefore, it may be said that the user P and the user R similarly prefer liking images of a "nature field". Therefore, among the images of the "nature field" owned by the user R, the image F having the imaging position information different from the imaging position information of the image of the "nature field" of the user P is retrieved from the SNS server 2, and the image and imaging, position information attached to the image are transmitted and presented to the first user terminal 100 as recommended information.

Among the images of the "nature field" owned by the user R, the imaging position information of the image F having the imaging position information different from the imaging position information of the image of the "nature field" of the user P is presented to the user P as the recommended imaging position information.

As described above, in a case where the print order image designated by the user P belongs to the "nature field", similarly, among the images of the "nature field" owned by the user R, the imaging position information of the image F having the imaging position information different from the imaging position information of the image of the "nature field" of the user P is presented to the user P as the recommended imaging position information. Since, referring to recommended imaging position information, the user P has an opportunity to search for and print an image of the place or to make a travel plan to the place, use of the image or travel service is promoted.

Recommended Information Presentation of the Art Field

Figure 7:
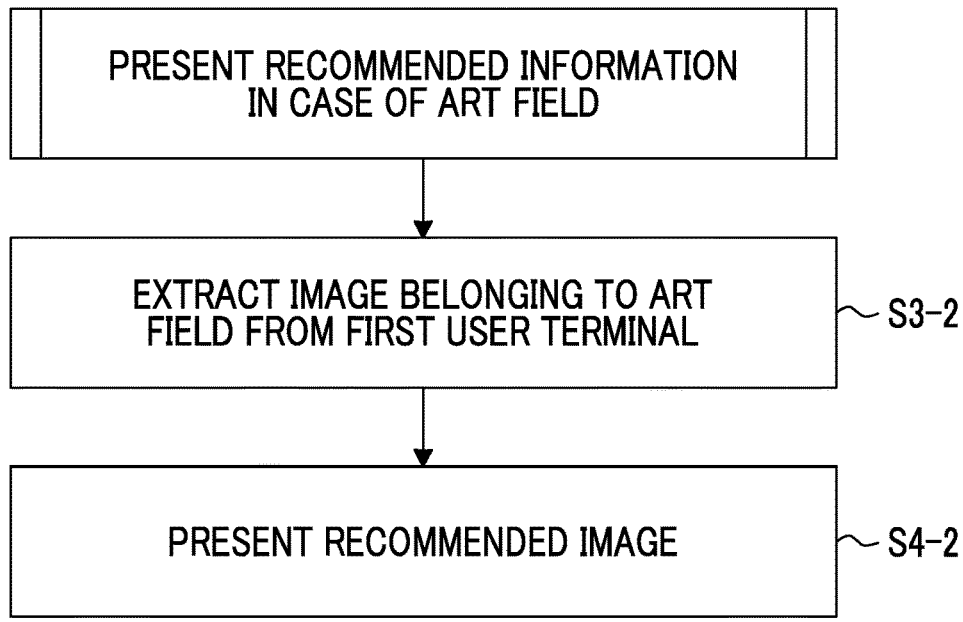
FIG. 7 is a flowchart showing the details of the recommended image extraction and recommended image presentation processing of an "art field".

FIG. 7 shows the details of recommended image extraction and recommended image presentation processing in a case where it is determined that the category of the trigger image is an "art field". That is, the following processing is processing performed in a case where it is determined in S2 that the category of the trigger image is an "art field".

In S3-2, the recommended information extracting unit 13 extracts an image (a first recommended candidate image) belonging to an "art field" which is the same category as a category "art field" determined by the category determining unit 12, from the first user terminal 100. The recommended information extracting unit 13 extracts the first recommended candidate image having an image feature amount that is similar to an image feature amount of the recommended candidate image and an image feature amount of the trigger image as a second recommended candidate image.

Figure 8:
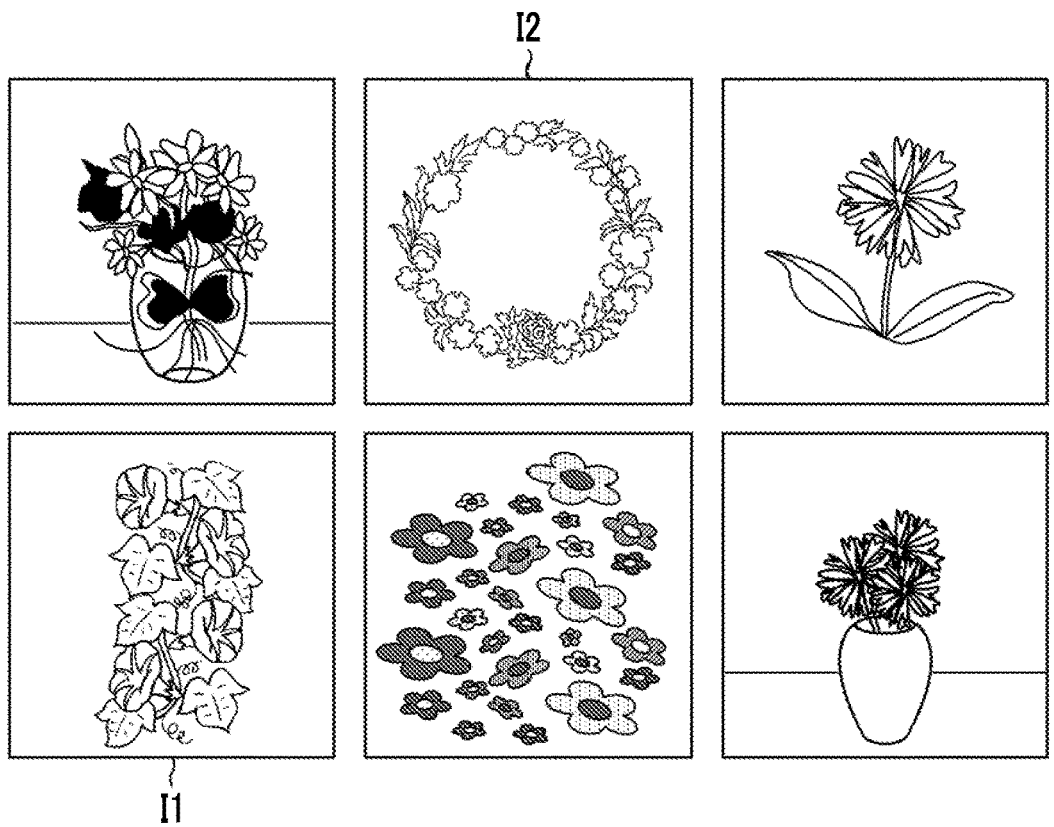

FIG. 8 shows an example of a trigger image 11 and a second recommended candidate image 12 having a feature amount similar to that of the trigger image II.

Furthermore, the recommended information extracting unit 13 compares the imaging position information and the imaging date and time information of the second recommended candidate image with the imaging position information and the imaging date and time information of the trigger image, and an image in which a distance between the imaging positions of the trigger image and the second recommended candidate image is equal to or less than a predetermined threshold value (for example, 1 km) and a difference between the imaging date and time information of the trigger image and the second recommended candidate image is equal to or more than a predetermined threshold value (for example, one hour), is excluded from the second recommended candidate image, and the remaining one is extracted as the recommended image.

Figure 9:
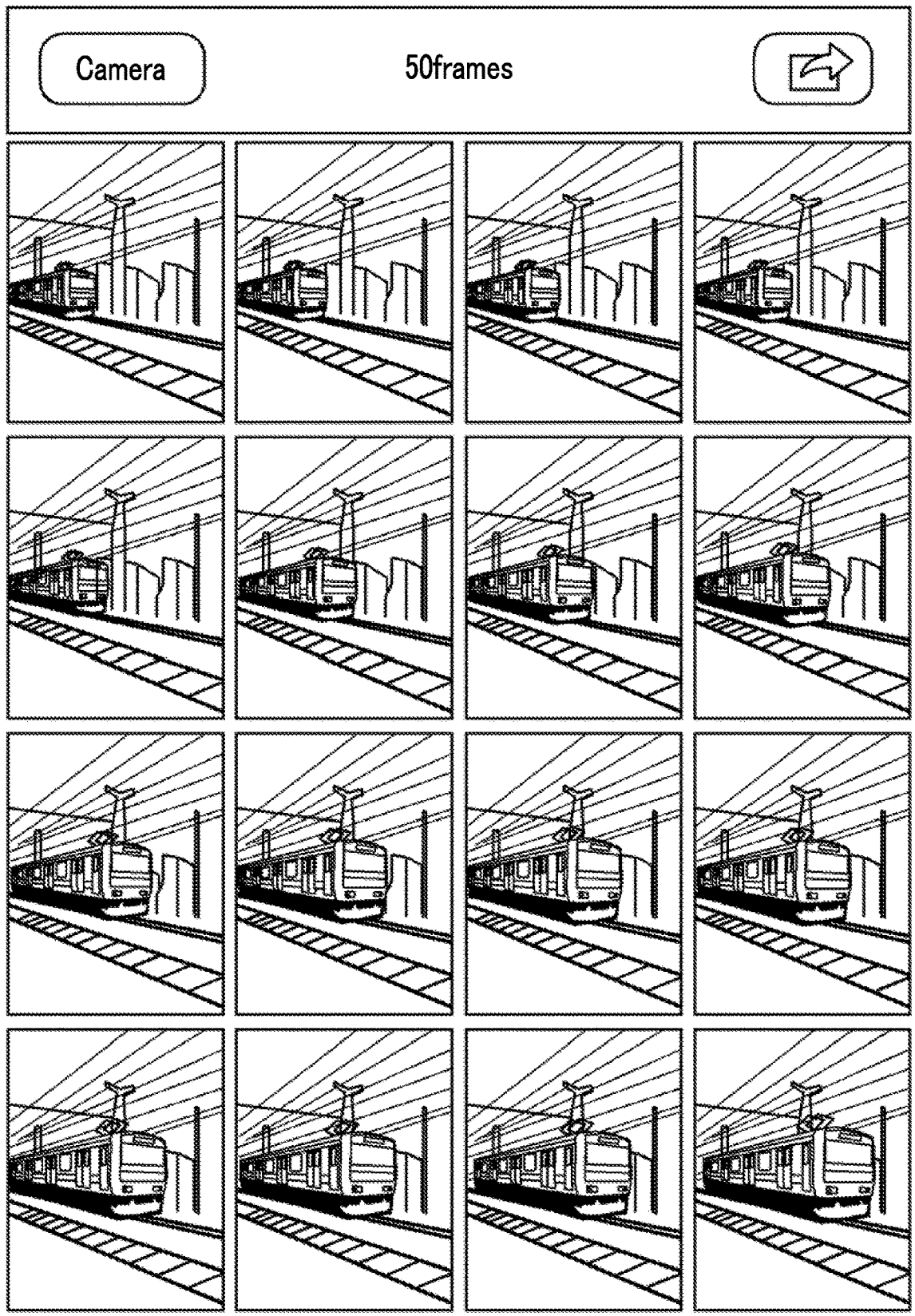
FIG. 9 is a diagram showing an example of an image group that is not an "art field".

This is for the purpose that, as shown in FIG. 9, images not suitable for printing, such as images imaged in a burst mode, images imaged again in the same time period, images failed to be imaged, and screen captures of a smartphone are not extracted as the recommended image.

In S4-2, the recommended information presenting unit 14 presents the recommended image extracted by the recommended information extracting unit 13 and the imaging position information and the image feature amount of the recommended image, to the first user terminal 100 as recommended information.

Figure 10:
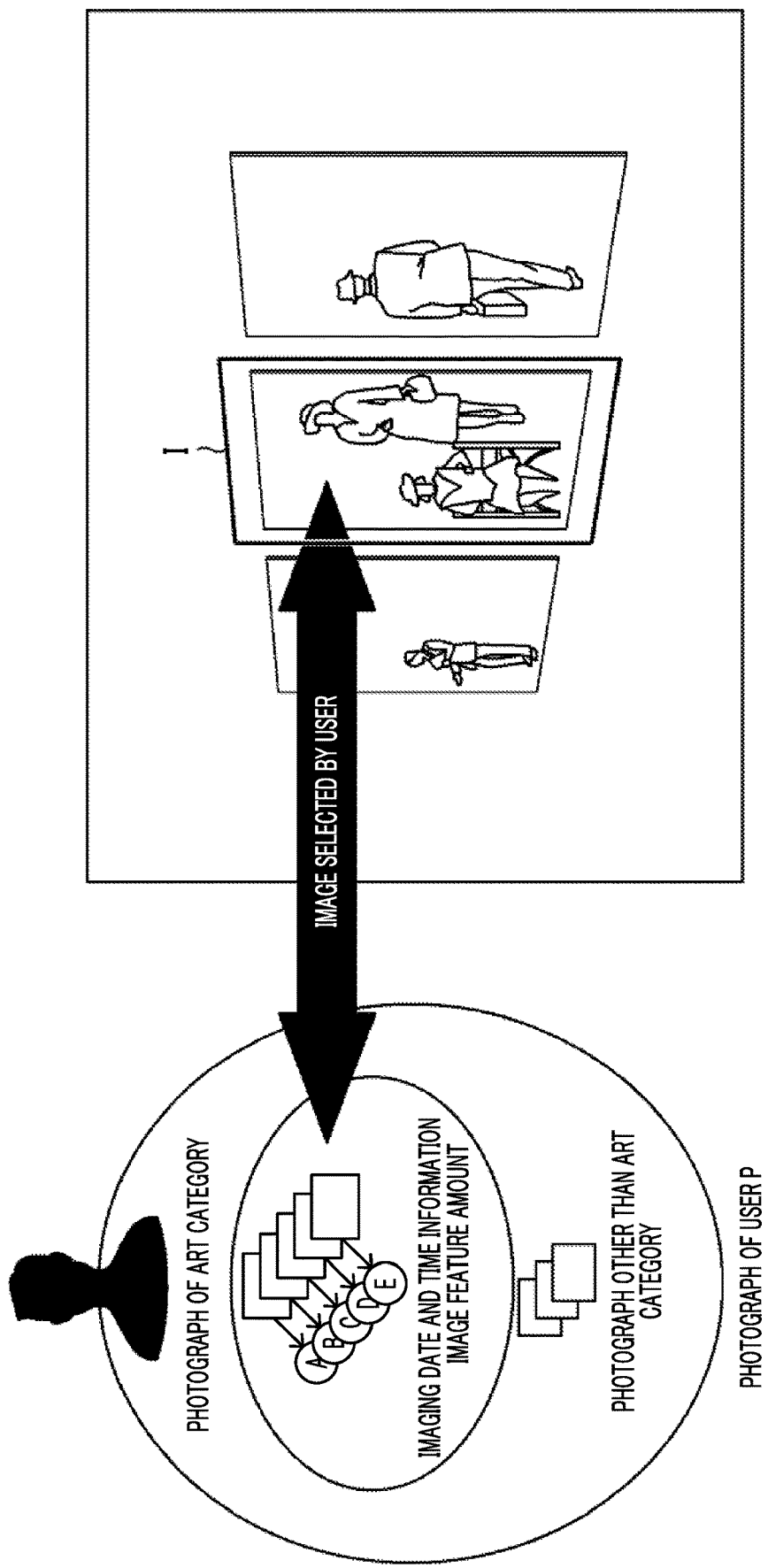
FIG. 10 is a diagram showing an example of a selected image of an "art field".
Figure 11:
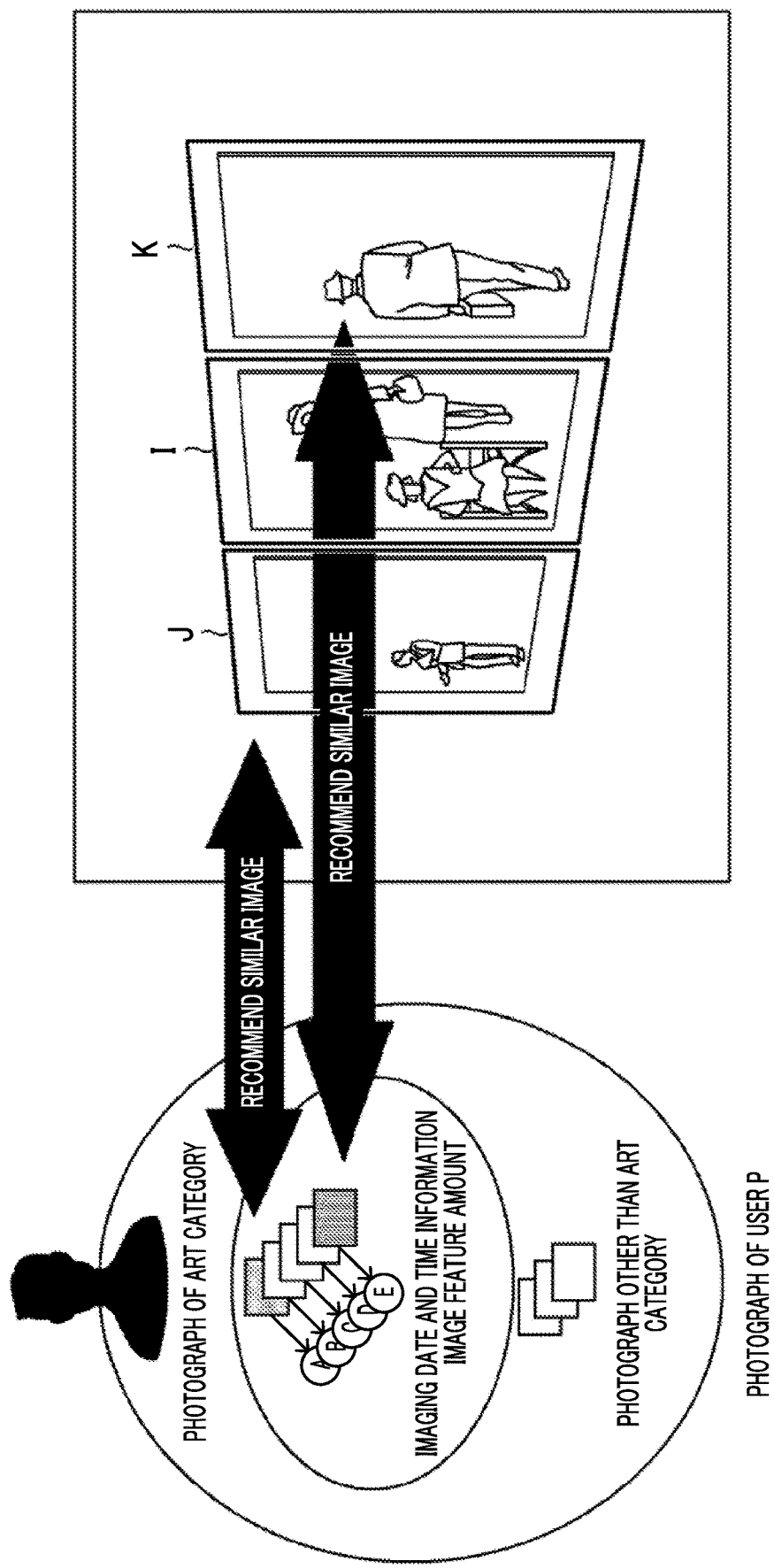
FIG. 11 is a diagram conceptually showing a method of presenting recommended information on an "art field".

FIG. 10 and FIG. 11 conceptually show a method of presenting recommended information on an "art field" by the recommended information presenting unit 14.

As shown in FIG. 10, it is considered that an image I of an "art field" is selected as an image for which a print order is given to the print server 3, from an image group stored in the first user terminal 100. The selected image I is a trigger image.

As shown in FIG. 11, an image 3 and an image K having a feature amount similar to that of a trigger image I are presented to the first user terminal 100 as recommended images. A function of the information presenting apparatus 1 may be included in the first user terminal 100.

As described above, in a case where the print order image designated by the user P belongs to an "art field", similarly, out of images belonging to the "art field", the image J and the image K having a feature amount similar to that of the print order image designated by the user P are extracted from the first user terminal 100. Thus, the use of the image J and the image K owned by the user P is promoted.

Recommended Information Presentation of Wedding Field

Figure 12:
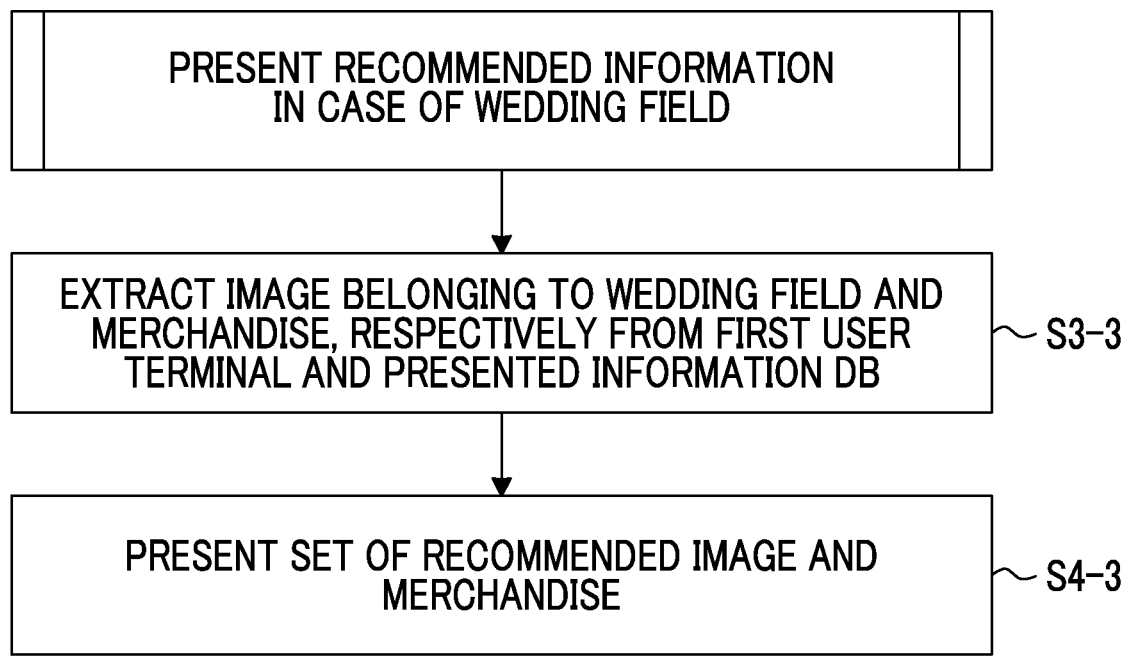
FIG. 12 is a flowchart showing the details of recommended image extraction and recommended image presentation processing of a "wedding field".

FIG. 12 shows the details of recommended image extraction and recommended image presentation processing in a case where it is determined that the category of the trigger image is a "wedding field". That is, the following processing is processing performed in a case where it is determined in S2 that the category of the trigger image is a "wedding field".

In S3-3, the recommended information extracting unit 13 extracts an image (recommended image) belonging to a "wedding field" which is the same category as a category "wedding field" determined by the category determining unit 12, from the first user terminal 100. For example, this means to detect a subject related to a wedding from among the images stored in the first user terminal 100, to estimate, as a wedding anniversary, an image group having the same imaging date as that of the detected image of the subject, and to classify the images of which imaging date is the wedding anniversary into a category of the "wedding field", Then, out of images classified into the category of the "wedding field", from among the images other than the already printed images, images satisfying conditions such as a large subject's size and good image quality are extracted as recommended images.

The first user terminal 100 may be promoted to confirm whether or not the estimated wedding anniversary is correct, and to enter corrected input. In a case where the corrected and entered wedding anniversary is input, an image group having the same imaging date as the corrected wedding anniversary is classified into a category of the "wedding field".

In a case where the wedding anniversary of the first user is registered in the SNS server 2, the print server 3, and other servers, an image group having the same imaging date as the registered wedding anniversary may be classified into a category of the "wedding field".

Furthermore, the recommended information extracting unit 13 extracts merchandise information attached to the recommended candidate image from the presented information DB 15.

In S4-3, the recommended information presenting unit 14 presents the recommended image and the merchandise extracted by the recommended information extracting unit 13, to the first user terminal 100 as recommended information.

Figure 13:
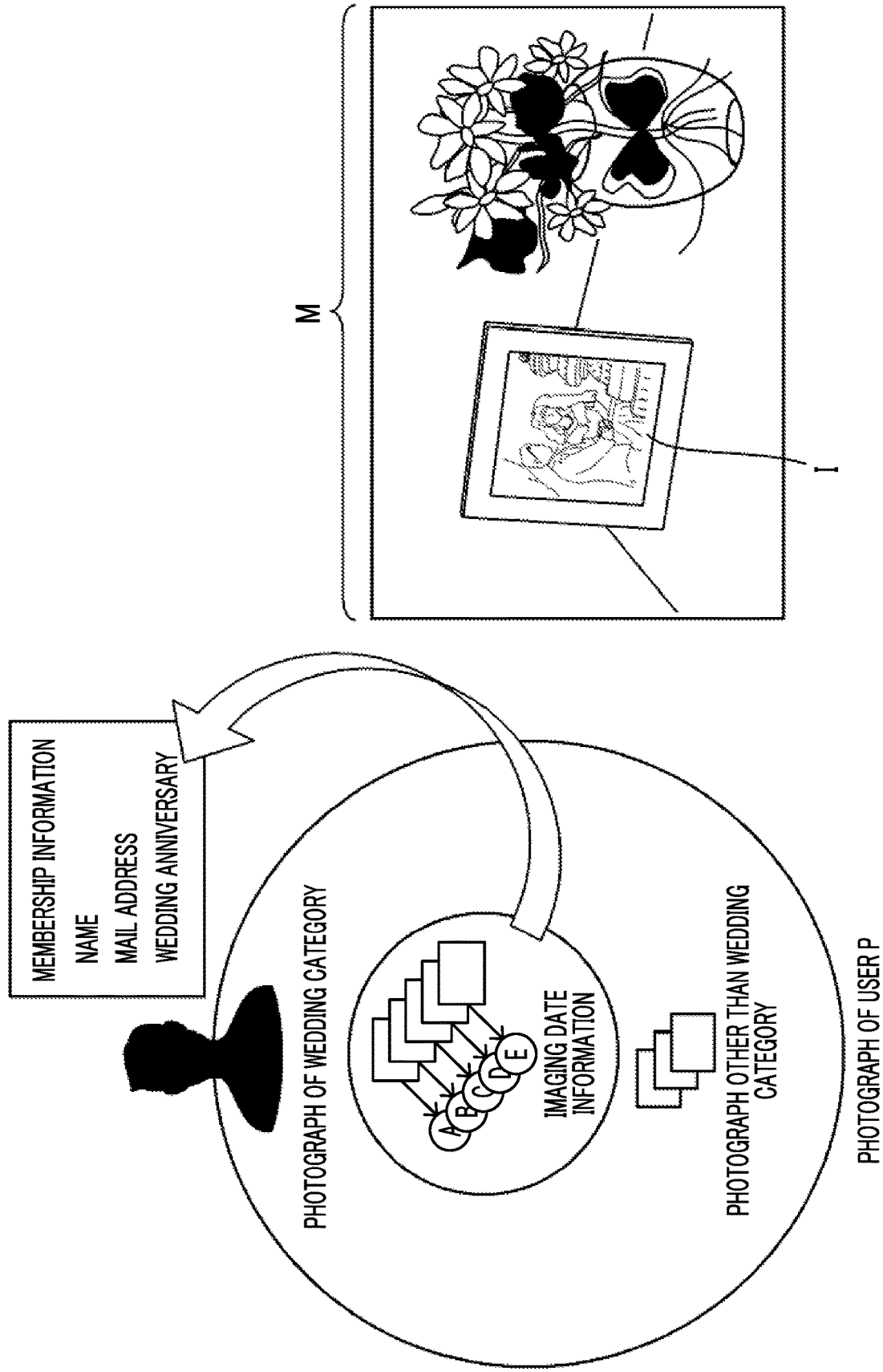
FIG. 13 is a diagram conceptually showing a method of presenting recommended information on a "wedding field".

FIG. 13 shows an example of presenting a preview image of a set M of a recommended image I and merchandise. In this figure, a preview image of a set M of a photo frame fitted with the recommended image I and a flower gift is presented to the first user terminal 100 as recommended information.

The timing of presenting this recommended information is good before (for example, one week before) the estimated or corrected wedding anniversary.

As described above, in a case where the print order image designated by the user P belongs to the "wedding field", similarly, out of the images belonging to the "wedding field", the image having the same imaging date as the print order image designated by the user P and merchandise M using the image is extracted from the first user terminal 100. Thus, the use of the merchandise M of the image owned by the user P is promoted.

Recommended Information Presentation of the Snap Field

Figure 14:
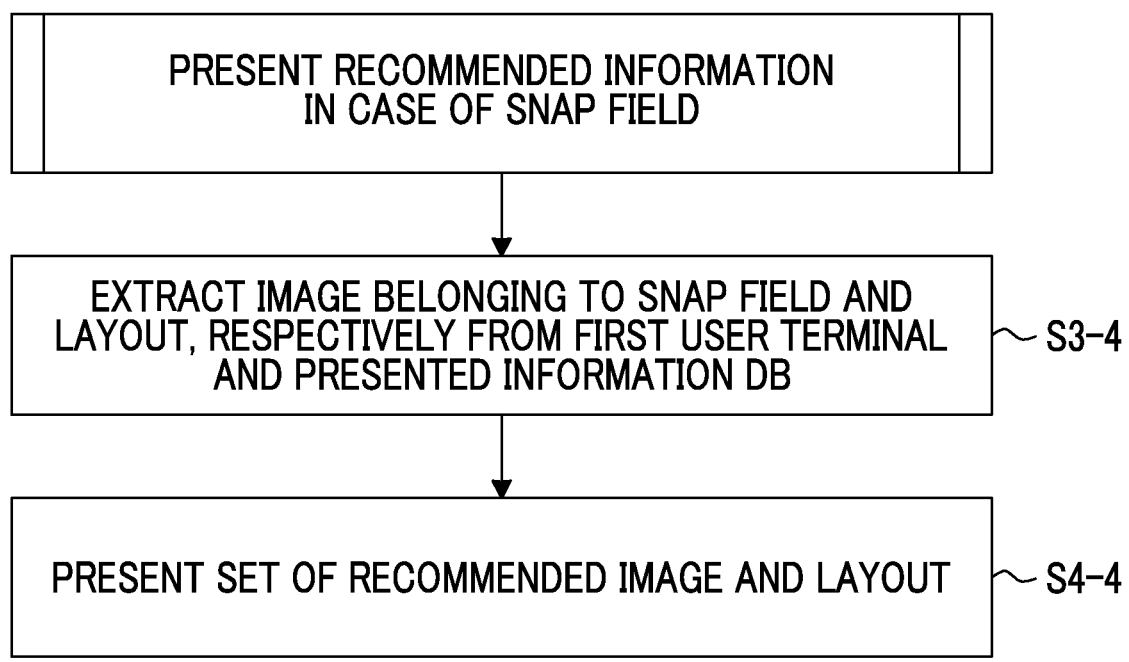
FIG. 14 is a flowchart showing the details of the recommended image extraction and the recommended image presentation processing of a "snap field".

FIG. 14 shows the details of recommended image extraction and recommended image presentation processing in a case where it is determined that the category of the trigger image is a "snap field". That is, the following processing is processing performed in a case where it is determined in S2 that the category of the trigger image is a "snap field".

In S3-4, the recommended information extracting unit 13 extracts an image (recommended image) belonging to a "snap field" which is the same category as a category "snap field" determined by the category determining unit 12, from the first user terminal 100. This means, for example, that images of a "snap field" are classified from among images stored in the first user terminal 100. Then, out of the images classified into the category of a "snap field", from among images other than the already printed images, images satisfying conditions such as a large subject size and good image quality are extracted as recommended images.

Furthermore, the recommended information extracting unit 13 extracts the recommended merchandise attached to the recommended image and a layout of merchandise, from the presented information DB 15. The number of the recommended images and the layout of the merchandise may be determined by information (a size and color of a wall decorated with the images, and the like) of a layout place separately designated from the first user terminal 100.

In S4-4, the recommended information presenting unit 14 presents the recommended image, the merchandise, and the layout of the merchandise extracted by the recommended information extracting unit 13, to the first user terminal 100 as recommended information.

Figure 15:
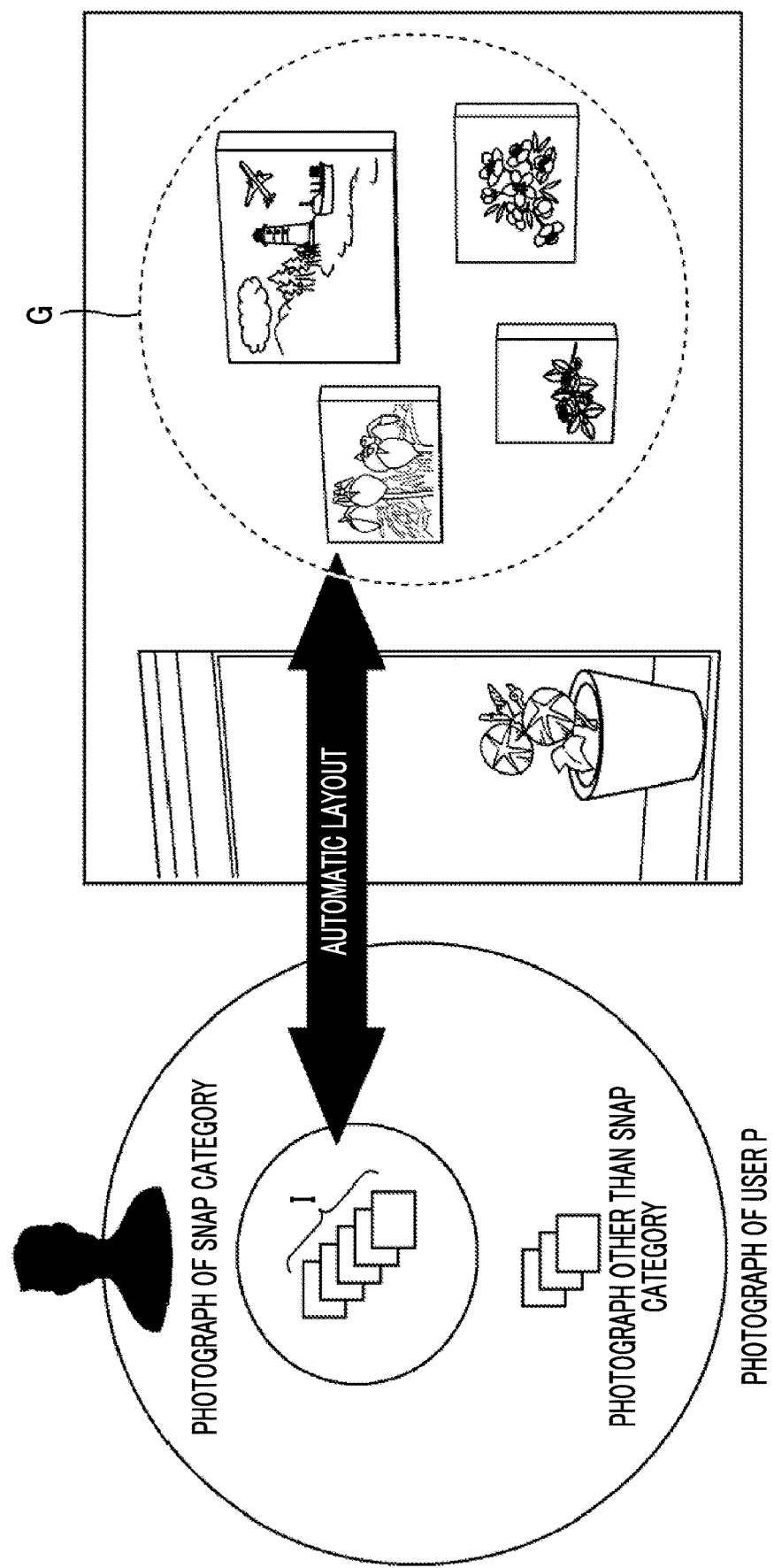
FIG. 15 is a diagram conceptually showing a method of presenting recommended information of a "snap field".

FIG. 15 shows an example of presenting the layout of the recommended images I. In this figure, a preview image of a layout G of a wall-attached album to which the recommended images are affixed is presented to the first user terminal 100 as recommended information.

As described above, since, in a case where the print order image designated by the user P belongs to the "snap field", similarly, a layout G of the wall-attached album of the recommended images belonging to the "snap field" is presented to the first user terminal 100, use of unused images owned by user P to the wall-attached album is promoted.

The information presenting apparatus 1 according to an embodiment of the present invention may be any type of a terminal apparatus as long as it is a terminal apparatus owned or managed by the user P. For example, the information presenting apparatus 1 may be one in which software configured with a program according to an embodiment of the present invention is installed on a personal computer owned or managed by the user P. Alternatively, the information presenting apparatus 1 may be one in which an application configured with the program according to an embodiment of the present invention is installed on a smart device such as a smartphone or a tablet owned or managed by the user P. The terminal apparatus owned or managed by the user P and another server may cooperate to configure the information presenting apparatus 1 according to the embodiment of the present invention.

EXPLANATION OF REFERENCES

1: information presenting apparatus
2: SNS server
3: print server
5: network
10: communicating unit
11: category classifying unit
12: category determining unit
13: recommended information extracting unit
14: recommended information presenting unit
15: presented information database
100: first user terminal
200: second user terminal
S1: image classifying step
S2: category determining step
S3: recommended information extracting step
S4: recommended information presenting step

What is claimed is:

1. An information presenting apparatus comprising a processor configured to:
    determine, from an imaging parameter of a first image selected from a first image group owned by a first user, that a category in which the first user is interested is a nature field;
    extract a first imaging position of the first image, the first imaging position being a location where the first image was captured;
    select, as a second image group, one of a plurality of image groups classified into the nature field and owned by users other than the first user, the one of the plurality of image groups including a largest number of images having imaging positions close to the first imaging position among the plurality of image groups, the imaging positions being locations where respective images of the largest number of images were captured;
    extract a second image of a second imaging position different from the first imaging position, from among the second image group classified into the nature field and owned by a second user other than the first user, the second imaging position being a location where the second image was captured; and
    present at least one of the second image and the second imaging position to the first user.

2. An information presenting apparatus comprising a processor configured to:
    determine, from a feature amount of a first image selected from a first image group owned by a first user, that a category in which the first user is interested is an art field, the feature amount being a weight for classifying the first image into the category;
    extract a second image other than the first image, having a feature amount similar to the feature amount of the first image, from among the first image group; and
    present the second image to the first user,
    wherein a distance between an imaging position of the first image and an imaging position of the second image is larger than a position threshold, and a difference between imaging date and time of the first image and imaging date and time of the second image is larger than a time threshold, the imaging positions of the first and second images being locations where the first and second images were captured, respectively.

3. The information presenting apparatus according to claim 1, wherein the processor is configured to:
    perform classification of each image of the first image group into any one of one or more categories, based on a feature amount of the first image group and determine the category in which the first user is interested, according to a result of the classification.

4. The information presenting apparatus according to claim 3,
    wherein the processor is configured to learn the classification of each image by machine learning, based on a learning image group and teacher data indicating a result of classification to any one of the one or more categories of each image of the learning image group.

5. The information presenting apparatus according to claim 4,
    wherein each image of the learning image group includes at least one of image feature information, metadata, or annotation information.

6. An information presenting method comprising:
    by a computer,
    determining, from an imaging parameter of a first image selected from a first image group owned by a first user, that a category in which the first user is interested is a nature field;
    extracting a first imaging position of the first image, the first imaging position being a location where the first image was captured;
    selecting, as a second image group, one of a plurality of image groups classified into the nature field and owned by users other than the first user, the one of the plurality of image groups including a largest number of images having imaging positions close to the first imaging position among the plurality of image groups, the imaging positions being locations where respective images of the largest number of images were captured;
    extracting a second image of a second imaging position different from the first imaging position, from among the second image group classified into the nature field and owned by a second user other than the first user, the second imaging position being a location where the second image was captured; and
    presenting at least one of the second image and the second imaging position to the first user.

7. A non-transitory computer-readable tangible medium which stores an image presenting program for causing a computer to execute the information presenting method according to claim 6.

8. An information presenting method comprising:
    by a computer,
    determining, from a feature amount of a first image selected from a first image group owned by a first user, that a category in which the first user is interested is an art field, the feature amount being a weight for classifying the first image into the category;

extracting a second image other than the first image, having a feature amount similar to the feature amount of the first image, from among the first image group; and presenting the second image to the first user, wherein a distance between an imaging position of the first image and an imaging position of the second image is larger than a position threshold, and a difference between imaging date and time of the first image and imaging date and time of the second image is larger than a time threshold, the imaging positions of the first and second images being locations where the first and second images were captured, respectively.

9. A non-transitory computer-readable tangible medium which stores an image presenting program for causing a computer to execute the information presenting method according to claim 8.

10. The information presenting apparatus according to claim 2, wherein the processor is configured to:

perform classification of each image of the first image group into any one of one or more categories, based on a feature amount of the first image group; and determine the category in which the first user is interested, according to a result of the classification.

11. The information presenting apparatus according to claim 10, wherein the processor is configured to learn the classification of each image by machine learning, based on a learning image group and teacher data indicating the result of the classification to any one of the one or more categories of each image of the learning image group.

12. The information presenting apparatus according to claim 11, wherein each image of the learning image group includes at least one of image feature information, metadata, or annotation information.

* * * * *